(12) United States Patent
Bowen

(10) Patent No.: US 11,658,802 B2
(45) Date of Patent: May 23, 2023

(54) PRIORITIZED CONTENT ENCRYPTION FOR RAPID BREACH RESPONSE

(71) Applicant: Synamedia Limited, Staines Upon Thames (GB)

(72) Inventor: Gareth John Bowen, Chandler's Ford (GB)

(73) Assignee: Synamedia Limited, Staines Upon (GB)

( * ) Notice: Subject to any disclaimer, the term of this patent is extended or adjusted under 35 U.S.C. 154(b) by 395 days.

(21) Appl. No.: 16/890,897

(22) Filed: Jun. 2, 2020

(65) Prior Publication Data
US 2021/0377000 A1    Dec. 2, 2021

(51) Int. Cl.
*H04L 9/06* (2006.01)
*H04L 9/14* (2006.01)
(Continued)

(52) U.S. Cl.
CPC ............ *H04L 9/0631* (2013.01); *G06F 21/10* (2013.01); *H04L 9/0637* (2013.01);
(Continued)

(58) Field of Classification Search
CPC ... H04L 9/0631; H04L 9/0637; H04L 9/0869; H04L 9/14; H04L 9/50; H04L 2209/24; H04L 2209/603; H04L 65/612; H04L 2209/60; H04L 9/0891; H04L 63/0428; H04L 63/06; H04L 65/70; G06F 21/10; G06F 2221/0755; G06F 21/6209; H04N 21/2347; H04N 21/2541; H04N 21/23473; H04N 21/26613; H04N 21/437;
(Continued)

(56) References Cited

U.S. PATENT DOCUMENTS

| | | | | |
|---|---|---|---|---|
| 7,522,725 B2* | 4/2009 | Graunke | ................. | H04L 9/065 380/42 |
| 8,295,492 B2* | 10/2012 | Suarez | ................ | H04L 63/0823 713/189 |

(Continued)

OTHER PUBLICATIONS

Search and Examination Report for corresponding GB Application No. 2107189.9 dated Feb. 14, 2022.
(Continued)

*Primary Examiner* — Abiy Getachew
(74) *Attorney, Agent, or Firm* — Fernando & Partners, LLP

(57) ABSTRACT

Techniques for rapid video on demand (VOD) media content breach response are described. In some embodiments, during content preparation, a server generates an encrypted media content item by generating a first encrypted portion using a first key derived from a first seed that is of a first type and generating a second encrypted portion using a second key derived from a second seed that is of a second type. In some embodiments, the server classifies the first portion in a first category (e.g., a prioritized category) and the second portion in a second category (e.g., a non-prioritized category). During a breach response, the server repairs the encrypted media content item by re-encrypting portions in the first category, e.g., re-encrypting the first encrypted portion using a replacement key derived from a replacement seed that is of the first type, and updating encryption metadata.

20 Claims, 7 Drawing Sheets

(51) Int. Cl.
*H04L 9/08* (2006.01)
*G06F 21/10* (2013.01)
*H04N 21/254* (2011.01)
*H04N 21/2347* (2011.01)
*H04L 9/00* (2022.01)

(52) U.S. Cl.
CPC .............. *H04L 9/0869* (2013.01); *H04L 9/14* (2013.01); *H04N 21/2347* (2013.01); *H04N 21/2541* (2013.01); *G06F 2221/0755* (2013.01); *H04L 9/50* (2022.05); *H04L 2209/24* (2013.01); *H04L 2209/603* (2013.01)

(58) Field of Classification Search
CPC ......... H04N 21/4627; H04N 21/63345; H04N 21/6377; H04N 21/835; H04N 21/8456; H04N 21/85406; H04N 21/63775; H04N 21/845; H04N 21/854
See application file for complete search history.

(56) References Cited

U.S. PATENT DOCUMENTS

| | | |
|---|---|---|
| 2008/0063210 A1* | 3/2008 | Goodman ............. H04L 9/0822 380/286 |
| 2011/0129087 A1 | 6/2011 | Zhang et al. |
| 2012/0173880 A1 | 7/2012 | Swaminathan |
| 2014/0143154 A1 | 5/2014 | Solow |
| 2019/0109708 A1* | 4/2019 | Roth ....................... H04L 9/065 |
| 2019/0238321 A1 | 8/2019 | Park et al. |

OTHER PUBLICATIONS

Asghar et al. "Transparent encryption with scalable video communication: Lower-latency, CABAC-based schemes", J. Vis. Commun. Image R. 45 (2017) pp. 122-136.

* cited by examiner

PRIORITIZED CONTENT ENCRYPTION FOR RAPID BREACH RESPONSE

TECHNICAL FIELD

The present disclosure relates generally to encryption of video on demand media content, and in particular, to encryption and re-encryption of video on demand media content for rapid breach response.

BACKGROUND

Digital rights management (DRM) utilizes license keys to protect media content delivered to end users via adaptive bitrate (ABR) streaming Typically license keys are produced based on certain variables, e.g., a content identifier (ID) and a seed that provides randomization and uniqueness for a given customer. The seed is critical because it allows an attacker to derive content keys from the content ID, thus bypassing DRM.

While some service providers lean towards just-in-time (JIT) packaging and encryption, many service providers continue to pre-encrypt their video on demand (VOD) media content to avoid the operational and computational complexity of JIT. These service providers often rely on a single seed to build up large VOD catalogs. In case of a security breach, based on the assumption that the media content published using the old key has already been compromised, a service provider may have to generate a new seed and use the newly generated seed for deriving future VOD content keys.

For certain media content (e.g., high definition media content), studio contracts may stipulate a complete recovery from a breach within a certain time frame (e.g., 30 days). However, the operational overhead and the computational expense of a full breach recovery (i.e., re-publishing the media content) are costly. For example, even re-encrypting the original content can take many months. Thus, previously existing VOD media content breach responses to replacing a stolen seed are inadequate, e.g., cannot respond fast enough to fulfill the contractual breach recovery obligations.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
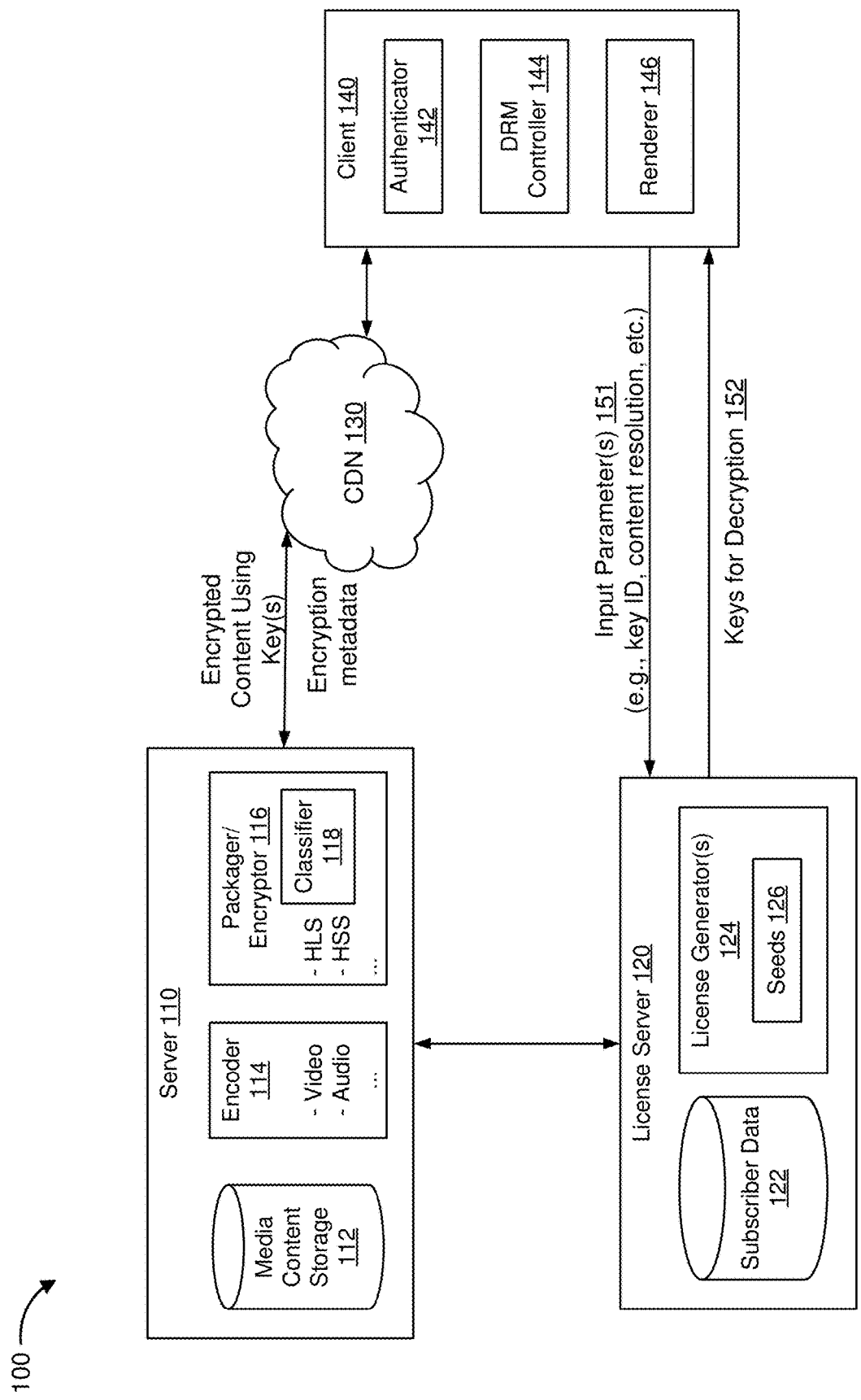
FIG. 1 is a block diagram of an example video on demand (VOD) content delivery system capable of rapid breach response in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Rapid video on demand (VOD) media content breach response methods and systems described herein designate a plurality of types of seeds for media content protection. For portions of a media content item that are of a certain media-element type, an encryptor prioritizes their encryption and uses a first type of seed to derive content keys for encryption. For other portions of the media content item that are of a different media-element type, the encryptor uses a second type of seed to derive content keys for encryption.

For example, for video content, the encryptor may prioritize samples that are references (e.g., I-frames) and use a seed that is of the first type to generate one set of keys for encryption. The encryptor may further classify samples that are non-references (e.g., P/B-frames) as non-prioritized and use a second seed that is of the second type to generate another set of keys for encryption. The license for such video content includes both sets of keys so that a client device can decrypt everything.

In the above example, in case of a breach, the loss of the second seed does not allow decoding of the underlying media content item. Because without the I-frames, the P/B frames cannot be used in isolation. In case of losing the first seed, the encryptor would use a replacement seed that is of the first type to generate another set of encryption keys for the I-frames. Because the time taken for re-encrypting the I-frames is considerably less than re-encrypting everything, the rapid breach response methods and systems described herein significantly shorten the breach response time.

In accordance with various embodiments, a method is performed on a server that includes one or more controllers and one or more non-transitory memory. The method includes generating an encrypted media content item from a media content item using a plurality of encryption keys. In some embodiments, the encrypted media content item is generated by encrypting a first portion of the media content item to generate a first encrypted portion using a first key of the plurality of encryption keys that is derived from a first seed of a first type. In some embodiments, the encrypted media content item is further generated by encrypting a second portion of the media content item to generate a second encrypted portion using a second key of the plurality of encryption keys that is derived from a second seed of a second type. In some embodiments, the first portion of the media content item is classified in a first category and the second portion of the media content item is classified in a second category. The method further includes determining whether or not the media content item has been breached. The method also includes repairing the encrypted media content item in accordance with a determination that the media content item has been breached. In some embodiments, the repairing includes re-encrypting the first encrypted portion using a replacement key derived from a replacement seed to generate a re-encrypted portion, where the replacement seed is of the first type. In some embodiments, the repairing also includes updating encryption metadata associated with the first encrypted portion to reference the re-encrypted portion and the replacement key.

EXAMPLE EMBODIMENTS

As explained above, service providers deliver video on demand (VOD) content protected with digital rights management (DRM) to end users via adaptive bitrate (ABR) streaming Currently, there are two main approaches to packaging the VOD content. One is an offline approach. The other is just-in-time (JIT) packaging. The demands for JIT packaging are largely due to divergent streaming solutions defined by different vendors, e.g., HTTP Live Streaming (HLS) vs HTTP Smooth Streaming (HSS), and the DRM solutions that accompany them.

There are trade-offs between these two approaches. For example, JIT packaging carries additional operational and/or resilience costs. On the other hand, the offline approach carries a higher storage cost. Weighing the trade-offs, many service providers choose to manage their VOD content using the offline approach to keep the operational and/or resilience costs low.

From a DRM perspective, in particular with respect to content protection, many existing DRM solutions opt to use algorithmic key generation, so that content keys are derived from various input parameters, e.g., asset identifier (ID) and content resolution, etc. To ensure the uniqueness, these parameters are mixed with a seed. The seed is critical to security. In case an attacker acquires such a seed, using the seed, they may be able to derive the content keys.

Studio requirements often stipulate a deadline (e.g., 30 days), by which the breach must be recovered (i.e., seed changed and content re-encrypted, etc.). Often a single seed protects many thousands of hours of content of an offline generated VOD catalog. In the case of a security breach and losing the single seed, the breach recovery of many thousands of hours of content in a VOD catalog could take a considerable amount of time (e.g., many months) and incur significant computational cost.

Some previously existing solutions assume that JIT packaging is the answer to the security issues and that the seed update can be managed at the time of acquisition. However, as the industry continues to consolidate streaming protocols and DRM techniques, the need for JIT packaging will likely diminish. Moreover, for those service providers that do not want to incur the high operational and resilience costs, JIT packaging is not an option. As such, the time for offline breach recovery is a function of available computing resources and the input/output bandwidth to re-encrypt the VOD catalog.

The rapid breach response methods and systems described herein enable a key-rotation capability for VOD content that can reduce the amount of VOD catalog re-encryption and atomically update individual elements in an asset. As a result, a service provider can use the techniques disclosed herein reactively in case of a breach to shorten the breach response time. Further, in accordance with some embodiments, the service provider can use the techniques disclosed herein proactively to implement a pseudo key rotation strategy for offline VOD content generation.

Reference is now made to FIG. 1, which is a block diagram of an exemplary video on demand (VOD) media content delivery system 100 with rapid breach response capability in accordance with some embodiments. While some of the embodiments describe the media content delivery techniques with reference to adaptive bitrate (ABR) protocol, other suitable media content delivery protocol may be used for implementing the subject matter. In some embodiments, the exemplary VOD media content delivery system 100 includes a server 110 (e.g., including one or more servers), a license server 120, a content delivery network (CDN) 130, and a client device 140. For rapid breach response, the exemplary VOD media content delivery system 100 uses a plurality of seeds 126 to generate a plurality of sets of keys for encryption.

Although a single server 110, a single license server 120, a single CDN 130, and a single client device 140 are illustrated in FIG. 1, the system 100 may include one or more servers 110, one or more license servers 120 as well as one or more client devices 140, and may include zero, one, or more CDNs 130. Further, the CDN(s) 130 may be included in the system 100 in order to provide higher scalability. As such, the server 110 (e.g., a headend) may provide the VOD media content to the client device(s) 140 directly and/or via the CDN(s) 130. For the sake of simplicity, the subject matter will be described hereinafter for the most part with reference to a single server 110, a single license server 120, a single client device 140, and sometimes a single CDN 130.

In some embodiments, the server 110 applies offline encryption of the VOD media content. In some embodiments, the server 110 includes one or more media content storages 112, one or more encoders 114, and one or more packagers/encryptors 116. In some embodiments, the one or more encoders 114 encode the VOD media content from the one or more media content storages 112 according to one or more protocols that are supported by the client device 140. For instance, the VOD media content items (also referred to hereinafter as "media content items", "media content", "media assets", "content", or "assets") obtained from the media content storages 112 include, but are not limited to, video content, audio content, visual content, images, text, and/or metadata, etc. The one or more encoders 114 then encode the various types of VOD media content items according to one or more protocols, such as H.265, H.264 with a fragmented MPEG-4 (fMP4) data structure, MPEG-2, MPEG-1, Advanced Audio Coding (AAC), MP3, AC-3, and/or any other suitable format.

The one or more packagers/encryptors 116 then assemble the encoded VOD media content items in preparation for the delivery to different clients 140 (optionally via the CDN 130). Further, the one or more packagers/encryptors 116 generate playlist(s) and/or metadata for the encrypted VOD media content item prior to delivery. For example, for a client device 140 that consumes the media content items through web browsers, the one or more packagers/encryptors 116 assemble the encoded VOD media content items according to various streaming solutions, e.g., HTTP Live Streaming (HLS) or HTTP Smooth Streaming (HSS), etc., and generate encrypted VOD media content items using a plurality of sets of keys from the license server 120 for DRM protection.

In some embodiments, the license server 120 includes one or more storages for subscriber data 122 (e.g., keys and/or entitlements, etc.) and one or more license generators 124. In accordance with the ABR protocol, the packager/encoder 116 can encode a media content item to a single stream configured for a single output bitrate or to multiple streams configured for a range of output bitrates. In some embodiments, the one or more license generators 124 rely on a plurality of seeds 126, which are of a plurality of types, to derive a plurality sets of keys. The plurality sets of keys are provided to the server 110 for encryption and re-encryption and to the client device 140 for decryption.

References herein to the storage for the subscriber data 122 (or the license generator 124) in the single form cover both embodiments where there is a single storage for subscriber data 122 (or the license generator 124) and embodiments where there is a plurality of storages for the subscriber data 122 (or a plurality of license generators 124). Further, although FIG. 1 illustrates the license server 120 being a separate server from the server 110, the servers 110 and 120 can be configured to collocate on one location and/or computing device. Alternatively, the servers 110 and 120 can be configured to be distributed over multiple locations and/or computing devices.

In some embodiments, the packager/encryptor 116 includes a classifier 118 to divide portions within a media content item into different categories and prioritize a certain category (or categories). As will be described in further detail below with reference to FIGS. 2-5, the packager/encryptor 116 encrypts portions within different categories using different sets of keys. Upon detecting a breach, portions that are within the prioritized category (or categories) are re-encrypted with a new set of keys. As such, relative to previously existing breach response of re-encrypting everything, the rapid breach response methods and systems described herein are more efficient. In some embodiments, the breach response, including the re-encryption process, is an offline process. In some embodiments, as will be described in further detail below, while the breach is managed asynchronously and running by another process, the server 110 can serve a mix of breached and non-breached segments from the same breached media asset in response to a request for the media asset.

On the client side, the client device 140 receives the encrypted content from the server 110 (optionally via the CDN 130) along with encryption metadata, e.g., mapping(s) for determining which key ID is used to secure which portion(s) of the media content. In some embodiments, the encryption metadata are included in one or more playlists, e.g., as key tag values. In some other embodiments, the encryption metadata are included in fragments, packets, and/or blocks of the encrypted content. Upon receiving the encrypted content, in some embodiments, an authenticator 142 on the client device 140 authenticates the identity of a user, e.g., whether the user has subscribed to a service in order to login to an application.

In some embodiments, in response to successful authentication of the user, the client device 140 obtains input parameter(s), such as a key ID and/or content resolution, etc., included in the key tag and/or the packets. In some embodiments, the client device 140 further includes a DRM controller 144 that sends the input parameter(s) 151 to the license generator 124. In response, subject to the entitlement of the user stored in the subscriber data storage 122, the license generator 124 uses the input parameter(s) 151 to provide decryption information to the client device 140, e.g., sets of decryption keys 152 and/or an initialization vector (IV), etc. In other words, the DRM licenses, which include the keys, come directly from the license server 120 upon requests in accordance with some embodiments. Upon receiving the sets of decryption keys 152, the DRM controller 144 decrypts the media content and passes the decrypted media content to a renderer 146 for display.

In some embodiments, the system 100 includes more, less, and/or different elements than shown in FIG. 1. Each of the elements of system 100 includes appropriate hardware, software, and/or firmware to perform the operations attributed to the element herein. Some examples of appropriate hardware, software, and/or firmware for certain elements will be provided further below. Operation(s) attributed to an element of system 100 herein should not be considered binding and in some embodiments, other element(s) in the system 100 may additionally or alternatively perform such operation(s).

Figure 2:
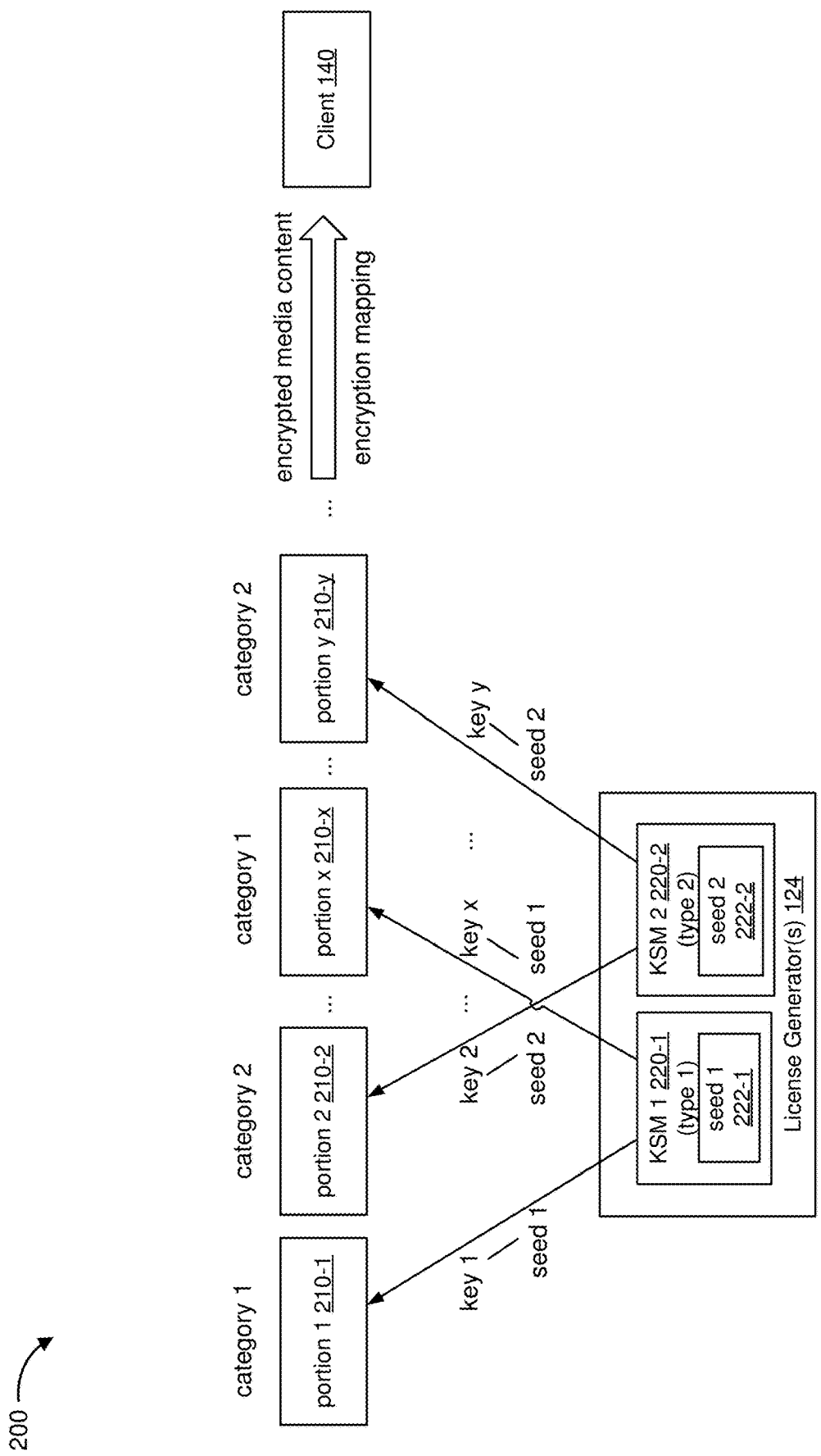
FIG. 2 is a block diagram illustrating encrypting media content for rapid breach response in accordance with some embodiments.

FIG. 2 is a block diagram 200 illustrating media content encryption in preparation for rapid breach response in accordance with some embodiments. In some embodiments, as explained above with reference to FIG. 1, the classifier 118 divides a media content item into different categories. For example, in FIG. 2, the classifier identifies that portion 1 210-1 is a media-element type that is different from portion 2 210-2. Accordingly, the classifier divides the media content item and classifies portion 1 210-1 into category 1 and portion 2 210-2 into category 2. Likewise, the classifier identifies that portion x 210-x is a media-element type different from portion y 210-y. Accordingly, the classifier classifies portion x 210-x into category 1 and portion y 210-2 into category 2.

In some embodiments, the one or more license generators 124 include multiple key server modules (KSMs) 220, e.g., KSM 1 220-1, KSM 2 220-2, etc. Each of the KSMs 220 generates one set of keys based on one type of seeds. For example, KSM 1 220-1 generates key 1 and key x based on seed 1 that is of type 1, and KSM 2 220-2 generates key 2 and key y based on seed 2 that is of type 2, etc.

From a server perspective (e.g., from the perspective of the server 110, FIG. 1), the component(s) responsible for encryption (e.g., the packager/encryptor 116, FIG. 1) prepare the media content by obtaining two sets of keys (e.g., key 1 and key x in one set, and key 2 and key y in the other set) for the media content. In some embodiments, the server generates the keys by itself. In some other embodiments, the server obtains the keys via an application programming interface (API) exposed by another component, e.g., the license generator(s) 124. During content preparation, the portions classified in category 1 are encrypted using the first set of keys that is derived from the first type of seed, e.g., key 1 and key x that are derived from seed 1. In comparison, the portions classified in category 2 are encrypted using another set of keys that is derived from the second type of seed, e.g., key 2 and key y that are derived from seed 2.

In some embodiments, according to the common encryption protection scheme (CENC) or other standards, the server generates encryption metadata within the encrypted media content item that specifies a mapping between the key ID and the portions of the media content item. The server then sends the encrypted media content item along with the encryption metadata to the client device 140. For example, in FIG. 2, according to CENC or other standards, the mapping specifies portion 1 210-1 is protected with key 1, portion 2 210-2 is protected with key 2, portion x 210-x is protected with key x, and portion y 210-y is protected with key y, etc.

Different from previously existing solutions that use the same seed to derive keys for the protection of all portions of the media content, the rapid breach response methods and systems described herein in accordance with some embodiments prioritize certain media-element type(s) (e.g., I-frames) and classify them in a prioritized category. The rapid breach response methods and systems then use different sets of keys to protect different portions in different categories. Further, the sets of keys are derived from different types of seeds. In this way, the same parameters (e.g., media asset ID or media content ID) can be used to generate different sets of keys for the protection of different portions of the media content. In other words, without changing the media asset ID, the keys can be changed based on different seeds.

Figure 3:
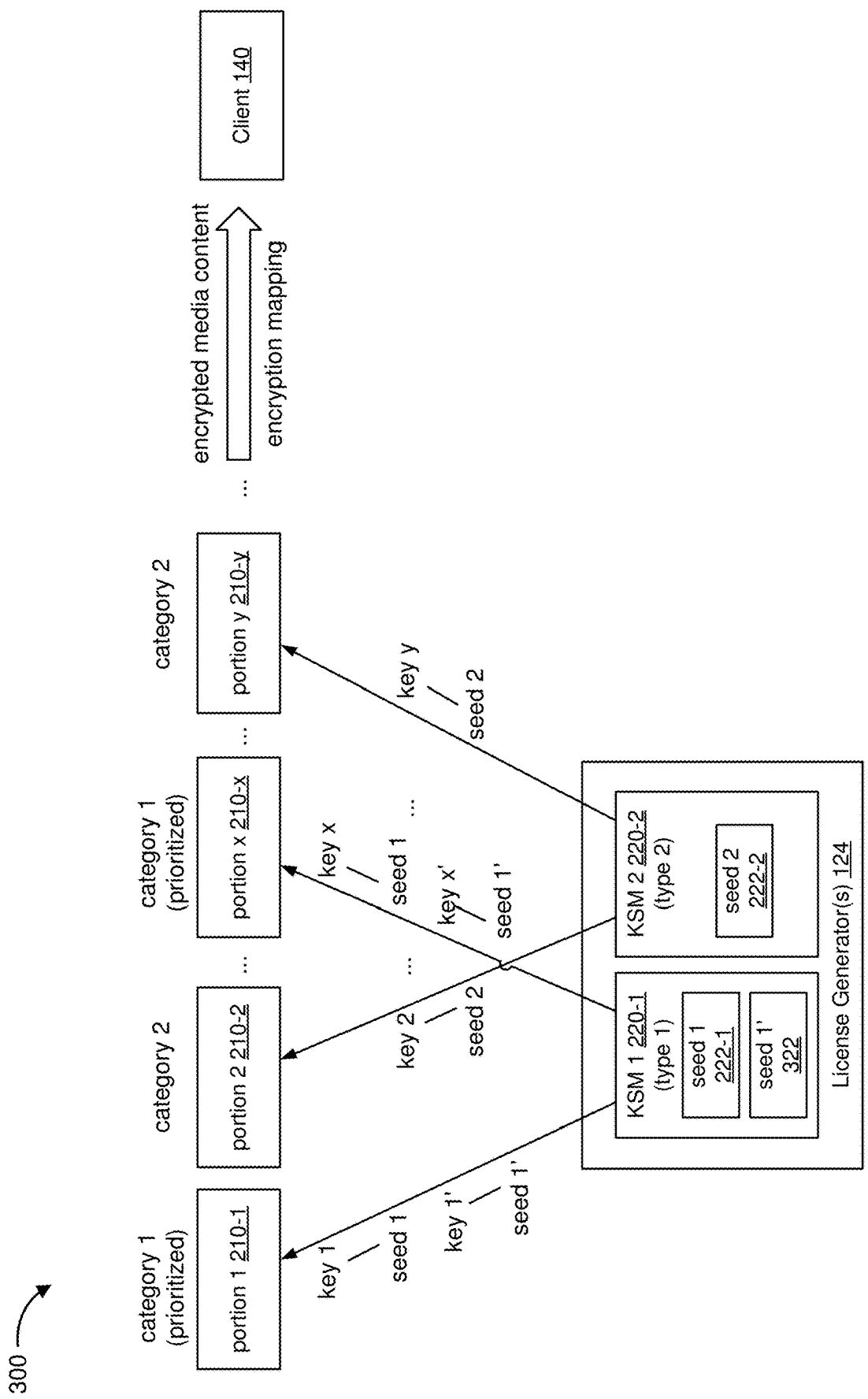
FIG. 3 is a diagram illustrating media content encryption during breach response in accordance with some embodiments.

FIG. 3 is a block diagram 300 illustrating media content encryption during breach response in accordance with some embodiments. Continuing the content preparation example described above with reference to FIG. 2, the server prepares the media content using two sets of keys, e.g., key 1 and key x in one set, and key 2 and key y in another set, etc. In response to a breach, from a server perspective (e.g., from the perspective of the server 110, FIG. 1), the server (e.g., the packager/encryptor 116, FIG. 1) obtains two sets of keys for the breached media asset. In one set of keys, in addition to the original key(s), replacement key(s) are also obtained based on a new seed that is of the same type, e.g., one set of keys includes both key 1 and key 1' derived based on a new seed 1'.

In some embodiments, the server generates the keys by itself. In some other embodiments, the server obtains the keys via an application programming interface (API) exposed by another component, e.g., the license generator(s) 124. Further, although FIG. 3 illustrates obtaining both key 1 and key 1' from the same KSM 1 220-1, in some embodiments, the license generator(s) 124 recovers the original key, e.g., key 1, from one KSM and obtains the new key from another KSM, e.g., obtaining key 1' from a different KSM.

During breach response, in some embodiments, the server (e.g., the classifier 118, FIG. 1) identifies prioritized portions of the encrypted media content secured with keys derived from seed 1 222-1, e.g., identifying portion 1 210-1 and portion x 210-x. In some embodiments, the server identifies these portions by inspecting the breached media content item, by reading the encryption metadata, or other suitable methods. Further, the server decrypts the identified portions with the keys derived from seed 1 222-1 and re-encrypts with the replacement keys derived from seed 1' 322, e.g., re-encrypting portion 1 210-1 with key 1' and re-encrypting portion x 210-x with key x'.

Having re-encrypted the portions of the breached media content item, in some embodiments, the server updates encryption metadata with details of the replacement key 1'. In some embodiments, when sending the encrypted media content to the client 140, the server includes updated encryption metadata to indicate which keys apply to which portions, e.g., portion 1 210-1 is protected with key 1', portion 2 210-2 is protected with key 2, portion x 210-x is protected with key x', portion y 210-y is protected with key y, etc. As such, the server overwrites the ranges and the key IDs in the encrypted media content item without accessing the clear media content (e.g., the media content retrieved from the media content storage 112 and/or encoded but unencrypted media content generated by the encoder 114 in FIG. 1). In some embodiments, the one or more license generators 124 purges and/or removes seed 1 222-1 from the DRM licensing system to complete the breach response.

As shown in FIG. 3, from a DRM perspective (e.g., from the perspective of the license server 120, FIG. 1), for as long as the service provider is still repairing the breached media content item, the DRM license for the breached media content item includes both the original key and the replacement key. For example, in FIG. 3, the license for the breached media content item would include (subject to entitlements), key 1, key 1', key x, and key x' derived from one type of seed, and key 2 and key y derived from a different type of seed. In comparison, as shown in FIG. 2, the DRM license for a non-breached media content item would include key 1 and key x in one set of keys and key 2 and key y in the other set of keys.

From the perspective of the client device 140, the client device 140 reads the encryption metadata to determine which key ID is used to secure each portion of the media content item. If the user of the client device 140 is entitled to the associated keys then the license server would provide the corresponding keys upon request. Upon receiving the keys, the client device 140 decrypts the encrypted media content item according to the mapping of key IDs to portions of the encrypted media content item in the encryption metadata. As such, the client device 140 is unaware whether it is requesting a breached asset (e.g., as shown in FIG. 3) or a non-breached asset (e.g., as shown in FIG. 2) and can handle a mix of seeds in the same media asset, e.g., seed 1, seed 1', and seed 2 in FIG. 3.

It should be noted that although FIGS. 2 and 3 illustrate generating two sets of keys based on two types of seeds and dividing the media content item into two categories, the license generator(s) 124 can provide more than two sets of keys (e.g., with more than two KSMs 220) based on more than two types of seeds, and the classifier can divide portions of the media content into more than two categories. Further, the relationship between the number of categories, the number of sets of keys, and the types of seeds may be one to many or many to many in accordance with some embodiments. Moreover, although FIGS. 2 and 3 illustrate prioritizing one category, e.g., prioritizing category 1, portions of the media content may be divided into more than two categories, with more than one category being prioritized. In such embodiments, the classifier may assign different priority to different prioritized categories to expedite and facilitate the re-encryption during breach response.

It should also be noted that although FIGS. 2 and 3 illustrate two separate KSMs 220, the KSMs 220 can be configured to collocate on a single computing device and/or implemented as one module. Alternatively, the KSMs 220 can be configured to be distributed over multiple (e.g., more than two) computing devices and/or multiple (e.g., more than two) modules. Operation(s) attributed to the KSMs 220 herein should not be considered binding and in some embodiments, other element(s) may additionally or alternatively perform such operation(s).

Figure 4:
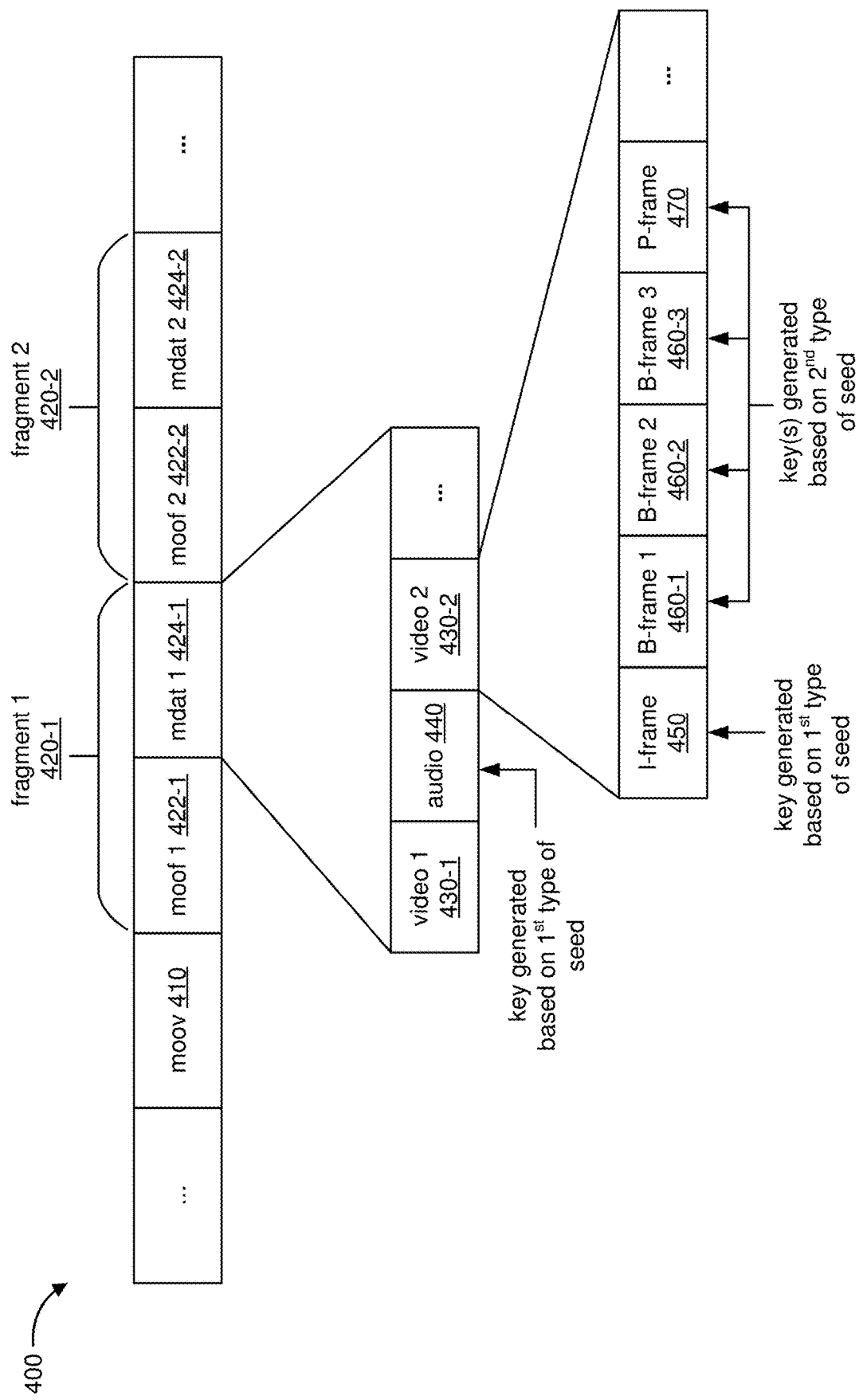
FIG. 4 illustrates an exemplary encrypted fragmented MP4 (fMP4) file for rapid breach response in accordance with some embodiments.

FIG. 4 illustrates an exemplary encrypted fragmented MP4 (fMP4) file 400 for rapid breach response in accordance with some embodiments. The exemplary fMP4 410 includes a number of discrete units known in the art as boxes or atoms. For example, as shown in FIG. 4, one box is a movie metadata (moov) box 410 that includes movie metadata, e.g., movie header, track information, etc. The exemplary fMP4 file 400 also includes a plurality of MP4 fragments, e.g., fragment 1 420-1, fragment 2 420-2, etc., collectively referred to hereinafter as fragments 420 or fragment 420.

Within each of the fragments 420, one box is a movie fragment (moof) box and another box is a media data (mdat) box, such as moof 1 422-1 and mdat 1 424-1 within fragment 1 420-1 and moof 2 422-2 and mdat 2 424-2 within fragment 2 420-2, etc. Though not shown in FIG. 4, the moof 422 box is a compound box including several other child boxes, e.g., a track fragment header (tfhd) box and a track fragment run (trun) box, etc. The trun box may indicate that the mdat box of the fragment includes information such as the number of samples (e.g., in sample_count field of trun) and a pointer into the mdat section indicating the start byte offset (e.g., in data_offset field of trun). The mdat box 424 includes a plurality of video frames and a plurality of audio chunks that are disposed of alternatively.

In the exemplary fMP4 file, the mdat 1 box 424-1 includes video chunk 1 430-1, followed by an audio chunk 440, and followed by video chunk 2 430-2, etc. Video chunk 2 430-2 further includes an I-frame 450, a number of B-frames 460 (e.g., B-frame 1 460-1, B-frame 2 460-2, and B-frame 3 460-3, etc.), and a P-frame 470, among others. As shown in FIG. 4, the server (e.g., the server 110, FIG. 1) encrypts different portions of the media content with different keys. For example, the server encrypts the I-frame 450 and the audio chunk 440 using keys that are generated based on a first type of seed and encrypts the plurality of B-frames 460 and the P-frame 470 using key(s) that are generated based on a second type of seed.

In some embodiments, instead of carrying both video chunks and audio chunks in the same fMP4 fragment as shown in FIG. 4, video chunks and audio chunks are delivered in independent segments. In the case of delivering the audio chunks separately, the audio chunks can be protected with its own key (e.g., independent of the video chunks) or with either set of the video keys. For example, according to certain security policies and requirements, the audio chunks can be protected with a set of keys derived from the first type of seed (e.g., the same type of seed or the same seed as for encrypting I-frames) and re-encrypted when the first type of seed is replaced during breach response. Alternatively, the audio chunks can be protected with a set of keys derived from the second type of seed (e.g., the same type of seed or the same seed as for encrypting P/B-frames) and not re-encrypted during breach response.

As is known in the art, reference frames (e.g., I-frames) are self-contained and/or independent such that once decoded, they can produce a picture. As such, from security perspective, protecting the reference frames has a higher priority than protecting the non-reference frames. In some embodiments, the server (e.g., the classifier 118, FIG. 1) classifies the reference frames (e.g., the I-frame 450) in one category, e.g., category 1 in FIGS. 2 and 3, and identifies the portions in category 1 as prioritized. Other types of frames (e.g., the P/B-frames 460 and 470) are decoded based on information from the reference frames, e.g., dependent upon the reference frames. Without the keys to decrypt the I-frames 450, it matters very little whether someone has the key to decrypt other types of frames that depend on I-frames. In other words, once decrypted, the B-frames 460 and P-frames 470 are not decodable for rendering, unless the I-frames 450 are decrypted and decoded as well. Accordingly, these non-reference frames are classified (e.g., by the classifier 118, FIG. 1) in a different category, e.g., category 2 in FIGS. 2 and 3, and are marked as non-prioritized.

In the case of a breach of a seed, previously existing breach response systems re-encrypt all media content that are protected with keys derived from a single seed. In contrast, assuming that both seeds for generating two sets of keys are compromised, with the solution described herein, once the service provider generates a replacement seed for the first type of seed and re-encrypts the I-frames 450 with the replace key(s) derived from the replacement seed, the attacker would not be able to continue decoding the media content for rendering. Stated differently, without the replacement seed, even though the same attacker would still be able to derive keys for decrypting the P/B-frames, the media content item would not be decodable for rendering. For video content, although the references, e.g., I-frames, are larger than non-references, e.g., P/B-frames, the amount of computation during breach response is significantly less than re-encrypting everything. As a result, the rapid breach response methods and systems result in considerably shorter breach response time without compromising security.

Figure 5:
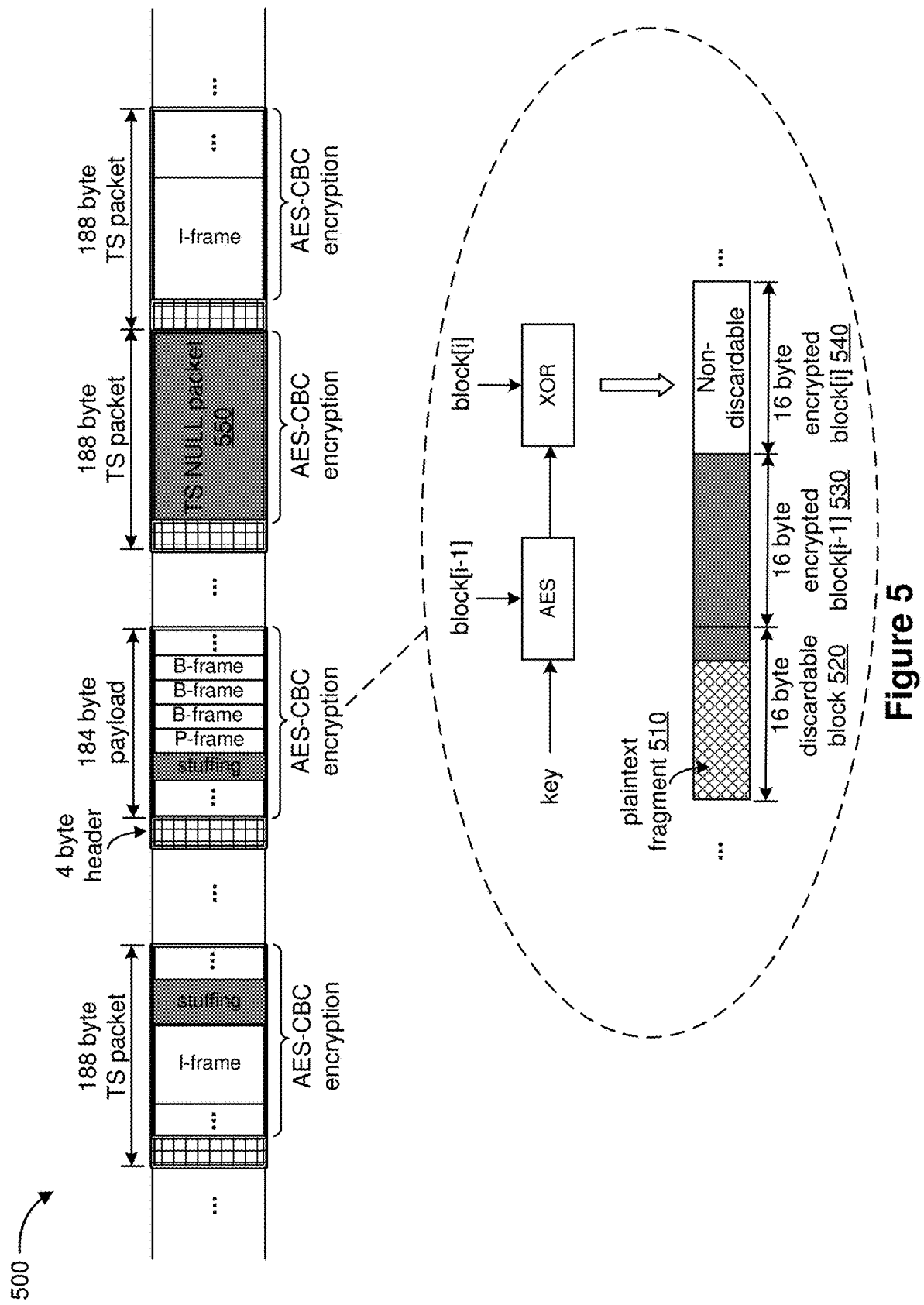
FIG. 5 illustrates an exemplary encrypted MPEG-2 transport stream (TS) for rapid breach response in accordance with some embodiments.

FIG. 5 illustrates an exemplary encrypted MPEG-2 transport stream (TS) 500 for rapid breach response in accordance with some embodiments. As is known in the art, a packet in an MPEG-2 transport stream includes 188 bytes, e.g., 4 bytes of header followed by 184 bytes of payload. Certain packets within an MPEG-2 transport stream are in predictable places, e.g., program association table (PAT) and program map table (PMT) are among the first few packets. Further, PAT and PMT packets often include stuffing bytes (shaded in grey) that are ignored by client devices. For example, a typical PAT packet can include over 100 bytes of stuffing. Although the stuffing is encrypted like other portions of the packet, one can overwrite at least a portion of the ciphertext corresponding to the stuffing bytes with plaintext without corrupting the cipher chain.

Some encryption techniques encrypt the MPEG-2 TS packet payloads according to advance encryption standard (AES) in cipher block chaining (CBC) mode (AES-CBC). In CBC mode, each block (e.g., with a block size of 16 bytes) is typically encrypted using a combination of a key (e.g., an encryption algorithm) and the previous encrypted block (i.e., the previous block after encryption). The first block is encrypted using an initialization vector (IV). As such, the encrypted output for each block depends on the block immediately before it. For example, in FIG. 5, a key and an encrypted 16-byte encrypted block[i−1] 530 are relied upon in order to generate a 16-byte encrypted block[i] 540.

In some embodiments, any MPEG-2 TS packet that includes at least one byte of data associated with prioritized portions of the media content is protected with a key derived from a seed for the prioritized portions. As the encryption scheme uses a block cipher, the key changes on a 16-byte boundary within the segment so the ranges are extended backwards or forwards to the nearest 16-byte boundary to ensure adequate protection of the prioritized portions. In order to extend the ranges, in some embodiments, prior to each key change location, a NULL packet 550 (also shaded in grey) is inserted into the TS 500 on a 188-byte boundary. In some embodiments, if the underlying package has stuffing bytes, the stuffing bytes can be used for writing the encryption metadata. The segment will then be encrypted with the content keys changing at the appropriate offsets, taking account of the inserted NULL packets. The NULL packet 550 is also ignored by client devices but provides 184 bytes of padding for replacement.

In a TS, it is possible to classify data as either discardable (e.g., portions of the stuffing bytes or the NULL packet 550 shaded in grey) or non-discardable. For example, non-discardable data include media content data that are used by demultiplexer and/or decoder for playback of clear content. The non-discardable data is preserved after decryption, whereas the discardable data might not be preserved. Therefore, at least a portion of the ciphertext representing the discardable data can safely be replaced with plaintext (e.g., accessed without decryption). In some embodiments, a plaintext fragment 510 is inserted into the encrypted TS 500 in the stuffing bytes, e.g., in a 16-byte encrypted block 520 that is discardable (shaded in grey).

To ensure that subsequent non-discardable data is not corrupted, the end of the plaintext fragment 510 allows space in the packet for the inclusion of a 16-byte part of the cipher chain before the next packet. In some embodiments, the space from the end of the plaintext fragment 510 to the beginning of the next packet includes at least one block of ciphertext for the discardable data is included immediately before the non-discardable data to avoid corruption. For example, in FIG. 5, the plaintext fragment 510 replaces at least a portion of the discardable block 520. An encrypted block[i−1] 530, which is discardable, is included immediately before an encrypted non-discardable block[i] 540. As such, there is at least one block of ciphertext from the end of the plaintext fragment 510 to the beginning of the encrypted non-discardable block[i] 540 to avoid corrupting the cipher chain.

In some embodiments, the plaintext fragment 510 includes the encryption metadata, so that the encryption metadata are readable by client devices with knowledge of the stuffing bytes. In some embodiments, the plaintext fragment 510 includes DRM metadata (e.g., key ID, offset from which key ID applies) and an offset to the next plaintext fragment. Walking this chain of plaintext fragments allows a client device to parse the DRM metadata within a segment to find the key ID and the offset of each encryption range. The client device can then use the encryption metadata to obtain the corresponding keys to decrypt the segment.

Figure 6C:
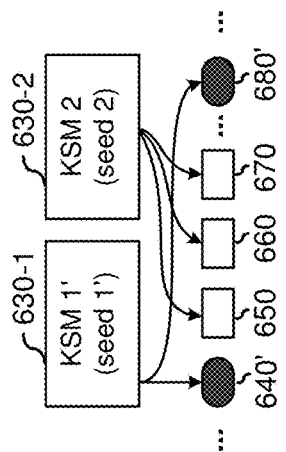
FIGS. 6A-6C illustrate an encrypted media content item with prioritized content encryption along a breach response timeline in accordance with some embodiments.
Figure 6B:
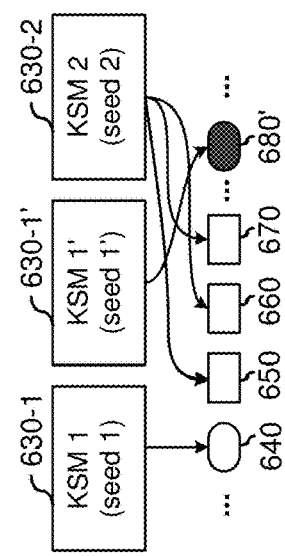
Figure 6A:
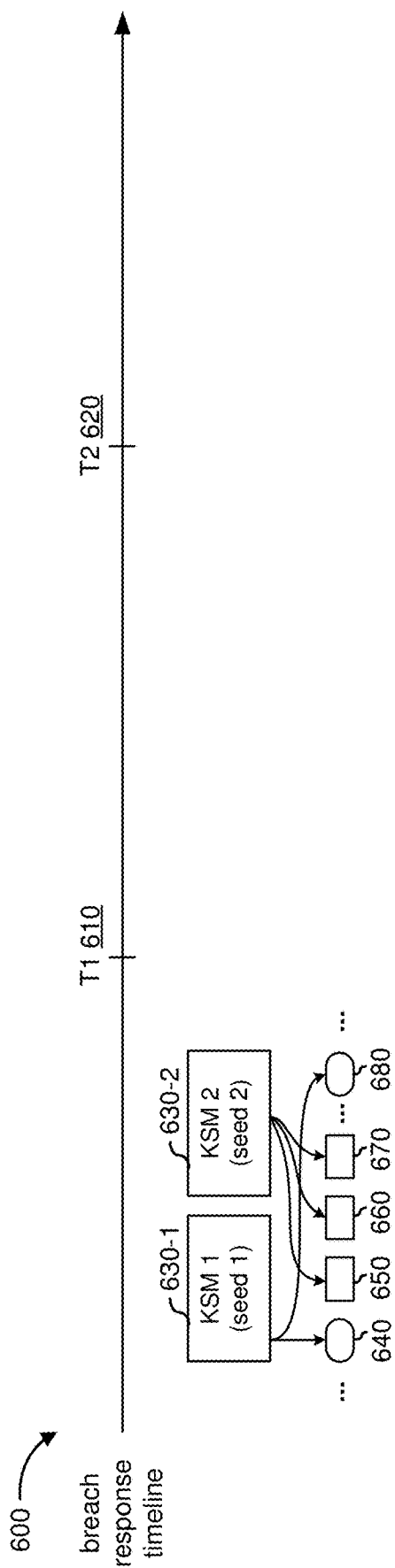

FIGS. 6A-6C illustrate an encrypted media content item with prioritized content encryption along a breach response timeline 600 in accordance with some embodiments. Along the breach response timeline, time $T_1$ 610 marks the start of the breach media content repair, and time $T_2$ 620 marks the end of the repair. With media content protected according to the solution described herein, a breach recovery process can run reactively over the VOD catalog and update everything in place. Assuming the DRM metadata is written into the encrypted segments, it is atomic, e.g., written into the encrypted fragment 420 in FIG. 4 or written in the 16-byte discardable block 520 in FIG. 5. With appropriate cache management downstream, the re-encrypted media content will gradually be served to end users. Even if an encrypted media content item is partially updated (e.g., a client device is trying to acquire the media content item during breach response), the encrypted media content item received by the client device is still playable as long as the DRM license has the keys.

In FIGS. 6A-6C, a media content item includes a plurality of portions 640-680, with different portions protected by sets of keys derived from a plurality of seeds. In some embodiments, the pill shaped blocks represent portions that are prioritized and re-encrypted during breach response. In contrast, the rectangular shaped blocks represent portions that are non-prioritized and are not re-encrypted during breach response. For example, in FIG. 6A, prior to $T_1$ 610, portions 640 and 680 are prioritized portions and protected by one set of keys derived from seed 1 provided by KSM 1 630-1. Also shown in FIG. 6A, portions 650-670 are non-prioritized portions and protected by another set of keys derived from seed 2 provided by KSM 2 630-2.

In response to identifying the media content item as breached, the server starts to repair the breached media content item at time $T_1$ 610. In FIG. 6B, in some embodiments, KSM 1' 630-1' provides seed 1' to replace the breached seed 1, where both seed 1 and seed 1' are of the same type, e.g., for protecting prioritized portions. Between time $T_1$ 610 and $T_2$ 620, the breached media content item has been partially repaired, e.g., portion 680 has been re-encrypted to generate portion 680' and the encryption metadata has been updated to associate the re-encrypted portion 680' with key(s) derived from seed 1'. In contrast, portion 640 has not been re-encrypted and is still protected by key(s) derived from compromised seed 1. When the client device receives the encryption metadata indicating one set of keys derived from seed 1 for portion 640 and another set of keys derived from seed 1' for the re-encrypted portion 680', the client device can obtain the DRM license that has both sets of keys according to the encryption metadata and then decrypt both portion 640 and portion 680' accordingly.

In some embodiments, as a client device can handle a mix of seeds in the same media content item, a service provider may proactively swap seeds on an ongoing basis, thus achieving a pseudo key rotation for VOD content. In some embodiments, the pseudo key rotation can be performed based on a policy specifying criteria associated with the popularity of the media content item, by age, by category, by value, at different time, and/or according to different schedules. For example, the seed(s) are rotated more often (e.g., at a higher frequency) for more popular media content items. Seeds for protecting older content are rotated first. Seeds for protecting certain media-element types are rotated more often, whereas seeds for protecting other media-element types are rotated less often or not rotated. Seeds for high value (e.g., 4K) media content items are rotated more often. In another example, the seed(s) are rotated every 24 hours, every week, every month, etc.

Once the repairing process completes, as shown in FIG. 6C, after time $T_2$ 620, the prioritized portions, e.g., portion 640 and portion 680, are re-encrypted to generate the re-encrypted portions 640' and 680' and protected with the replacement seed 1'. In some embodiments, the compromised seed, e.g., seed 1, is purged and/or removed from the system at the end of the breach response process.

For very large VOD media content catalogues, the operational overhead and computational expense of a full breach recovery (i.e., republishing the breached media content) can be costly. Even re-encrypting the original media content could take many months, let alone a full breach recovery, which includes at least decoding and packaging in addition to re-encrypting. The rapid breach response methods and systems described herein use prioritized content encryption to address the aforementioned issues. When preparing the media content, certain portions are prioritized and encrypted with one set of keys. In case of a breach, as shown in FIG. 6, the prioritized portions are re-encrypted with a new set of keys. As a result of re-encrypting a fraction of the media content, e.g., re-encrypting portion 640 and portion 680 among the portions, the amount of computation in breach response is reduced considerably for very large VOD media content catalogues.

Figure 7:
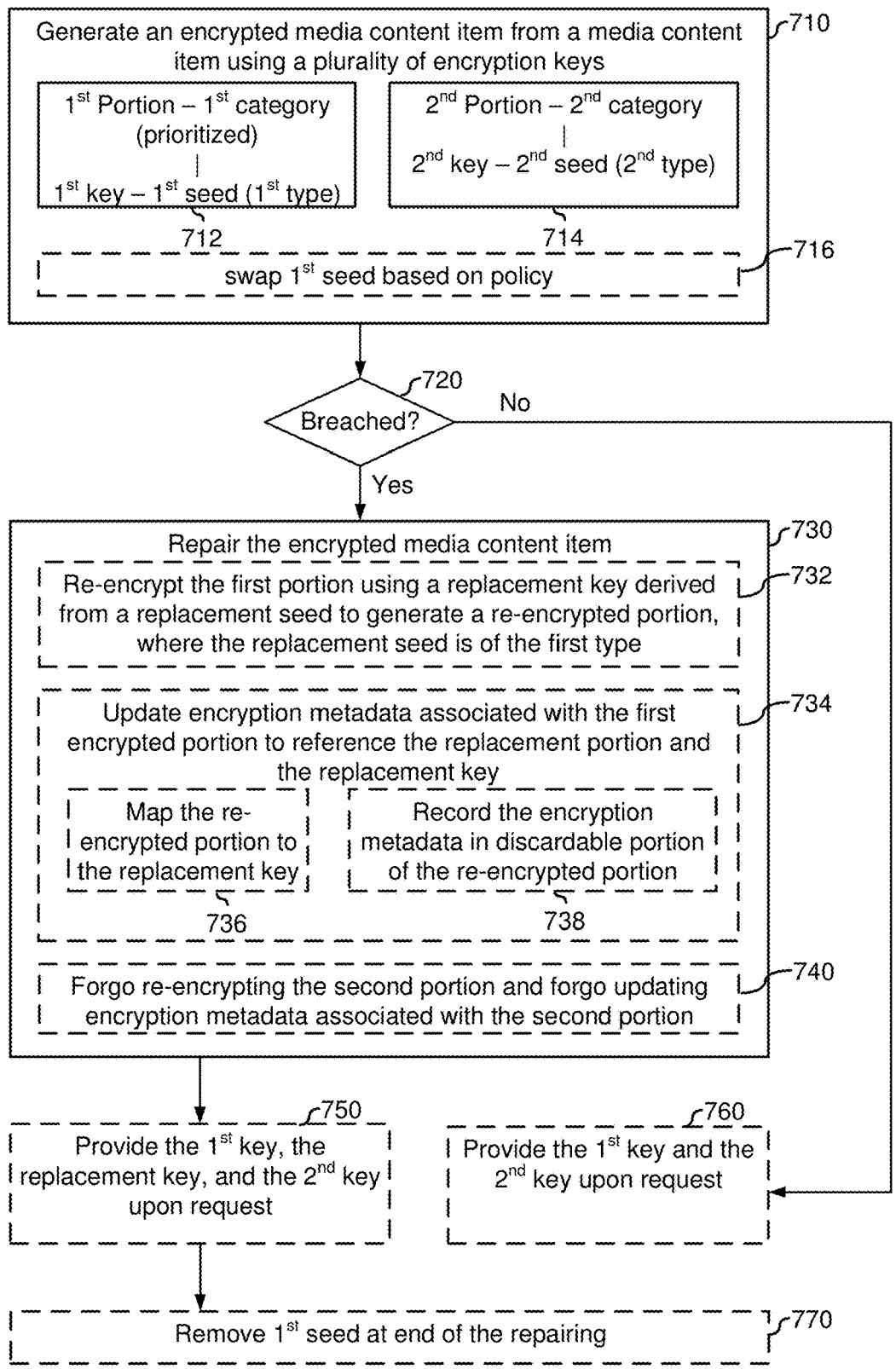
FIG. 7 is a flowchart illustrating a rapid breach response method in accordance with some embodiments.

FIG. 7 is a flowchart representation of a rapid breach respond method 700 in accordance with some embodiments. In some embodiments, the method 700 is performed at a server (e.g., the server 110 and/or the license server 120, FIG. 1) with one or more controllers and one or more non-transitory memory. In some embodiments, the server includes at least one encoder (e.g., the encoder 114, FIG. 1) to encode media content items (e.g., to encode the media content items obtained from the media content storage 112, FIG. 1) and at least one encryptor (e.g., the packager/encryptor 116, FIG. 1). In some embodiments, the at least one encryptor further includes a classifier (e.g., the classifier 118, FIG. 1) to classify portions in the media content items in order to prioritize encryption and re-encryption.

Briefly, the method 700 includes, e.g., with the packager/encryptor 116 (FIG. 1), generating an encrypted media content item from a media content item using a plurality of encryption keys by: (a) encrypting a first portion of the media content item to generate a first encrypted portion using a first key of the plurality of encryption keys that is derived from a first seed of a first type, and (b) encrypting a second portion of the media content item to generate a second encrypted portion using a second key of the plurality of encryption keys that is derived from a second seed of a second type, wherein the first portion of the media content item is classified in a first category and the second portion of the media content item is classified in a second category; determining whether or not the media content item has been breached; and repairing the encrypted media content item in accordance with a determination that the media content item has been breached by: (a) re-encrypting the first encrypted portion using a replacement key derived from a replacement seed to generate a re-encrypted portion, wherein the replacement seed is of the first type, and (b) updating encryption metadata associated with the first encrypted portion to reference the re-encrypted portion and the replacement key.

To that end, as represented by block 710, the method 700 includes, e.g., with the encryptor, generating an encrypted media content item from a media content item using a plurality of encryption keys. As represented by block 712, in some embodiments, the encrypted media content item is generated by encrypting a first portion of the media content item to generate a first encrypted portion using a first key of the plurality of encryption keys that is derived from a first seed of a first type. Further as represented by 714, the encrypted media content item is also generated by encrypting a second portion of the media content item to generate a second encrypted portion using a second key of the plurality of encryption keys that is derived from a second seed of a second type. Also as represented by blocks 712 and 714, in some embodiments, the first portion of the media content item is classified in a first category and the second portion of the media content item is classified in a second category.

In some embodiments, the first category and the second category are classified, e.g., by the classifier 118 (FIG. 1), based on media-element types. In some embodiments, the method 700 further includes classifying the first portion of the media content item in the first category based on the first portion of the media content item which includes a first media-element type, and classifying the second portion of the media content item in a second category, different from the first category, based on the second portion of the media content item which includes a second media-element type. In some embodiments, as represented by block 712, the first category is prioritized. In such embodiments, the first media-element type includes one or more of a reference frame and an audio chunk, and the second media-element type includes a non-reference frame in accordance with some embodiments.

For example, as shown in FIG. 2, the classifier classifies portion 1 210-1 and portion x 210-x into category 1. During encryption, the encryptor encrypts portion 1 210-1 and portion x 210-x using key 1 and key x that are derived from seed 1, where seed 1 is of the first type. In contrast, the classifier classifies portion 2 210-2 and portion y 210-y into category 2. During encryption, the encryptor encrypts portion 2 210-2 and portion y 210-y using key 2 and key y that are derived from seed 2, where seed 2 is of the second type. In another example, as shown in FIG. 4, based on the media-element type, reference frames and audio chunks such as the I-frame 450 and the audio chunk 440 are classified in the same category, e.g., the prioritized category. Further, as shown in FIG. 4, non-reference frames such as the B-frames 460 and the P-frame 470 are classified in the same category. As such, the I-frame 450 and the audio chunk 440 are protected with key(s) derived from the first type of seed, whereas the B-frames 460 and the P-frame 470 are protected with key(s) derived from the second type of seed.

Referring back to FIG. 7, as a client device can handle a mix of seeds in the same media content item, a service provider may proactively swap seeds to achieve a pseudo key rotation for VOD content. As represented by block 716, in some embodiments, the method 700 includes swapping the first seed according to a policy. In some embodiments, the seed swapping includes obtaining a swapping seed that is of the first type; identifying media content items with portions classified in the first category; and re-encrypting the portions of the media content items using keys derived from the swapping seed.

For example, FIG. 4 shows that the client device can handle the mix of seeds in the same media content item. In such a system, a service provider may proactively swap seeds and re-encrypt the prioritized portions, e.g., re-encrypting the I-frame 450 and the audio chunk 440, on an ongoing basis. In some embodiments, the seed rotation or swapping policy specifies criteria associated with one or more of popularities of the media content items, ages of the media content items, values of the media content items, and a swapping schedule. Accordingly, the pseudo key rotation can be performed based on the popularity of the media content item, by age, by category, by value, at different time, and/or according to different schedules.

The method 700 continues, with the controller determining, as represented by the decision block 720, whether or not the media content item has been breached. In some embodiments, as represented by block 730, in accordance with a determination that the media content item has been breached ("Yes" branch of the decision block 720), the method 700 includes repairing the encrypted media content item. In some embodiments, as represented by block 732, the repairing includes re-encrypting the first encrypted portion using a replacement key derived from a replacement seed to generate a re-encrypted portion, where the replacement seed is of the first type. In some embodiments, re-encrypting the first encrypted portion of the media content item using the replacement key derived from the replacement seed includes obtaining the replacement key and the first key; decrypting the first portion of the media content item using the first key; and encrypting the first portion of the media content item using the replacement key. For example, as shown in FIG. 3, during the repair process, the encryptor uses key 1 and key x, which are derived from the compromised seed 1, to decrypt portion 1 210-1 and portion x 210-x in the prioritized category 1. The encryptor also uses key 1' and key x', which are derived based on the replacement seed 1', to re-encrypt portion 1 210-1 and portion x 210-x.

Still referring to FIG. 7, as represented by block 734, in some embodiments, the repairing further includes updating encryption metadata associated with the first encrypted portion to reference the re-encrypted portion and the replacement key. In some embodiments, as represented by block 736, updating the encryption metadata includes updating mappings of portions of the encrypted media content item to the plurality of keys, including mapping the re-encrypted portion to the replacement key. For example, according to the common encryption protection scheme (CENC) or other standards, the encryption metadata within the fragment 420 (FIG. 4) can specify a mapping between key IDs and portions of the media content item, e.g., a mapping of the I-frame 450 and the key ID for encrypting I-frame 450, a mapping of the audio chunk 440 and the key ID for encrypting the audio chunk, a mapping of the P/B-frames 460 and 470 and the key ID for encrypting the P/B-frames 460 and 470.

In some embodiments, as represented by block 738, updating the encryption metadata includes identifying a discardable portion in the re-encrypted portion; and recording the encryption metadata, including a key identifier associated with the replacement key and a range in the re-encrypted portion the replacement key applies, in the discardable portion. Further, in such embodiments, to avoid corruption of the cipher chain, the encryption metadata is recorded at least one block before a non-discardable portion in the re-encrypted portion in accordance with some embodiments. For example, in FIG. 5, the encryptor identifies the 16-byte discardable block 520 and inserts the plaintext fragment 510 into the discardable block 520. The plaintext fragment 510 includes the encryption metadata, e.g., DRM metadata (e.g., key ID, offset from which key ID applies) and an offset to the next plaintext fragment, etc. Because the plaintext fragment 510 is placed in the discardable block 520 and is followed by another discardable block 530 before the non-discardable block 540, the non-discardable block 540 would not be corrupted. Accordingly, the client device can retrieve the encryption metadata and use the encryption metadata to facilitate decryption.

Continuing the method 700, in some embodiments, as represented by block 740, for portions that are not in the prioritized category, such as the second portion, repairing the encrypted media content item in accordance with the determination that the first media content has been breached further includes forgoing re-encrypting the second portion of the media content item; and forgoing updating encryption metadata associated with the second portion. For example, as shown in FIG. 3, portion 2 210-2 and portion y 210-y are not in the prioritized category. As a result, portion 2 210-2 and portion y 210-y are not re-encrypted and the respective encryption metadata still reference key 2 and key y, which are derived from seed 2.

In some embodiments, as represented by block 750, the method 700 further includes, in accordance with the determination that the media content item has been breached (e.g., the "Yes" branch from the decision block 720), the server (e.g., the license server 120, FIG. 1) provides the first key, the replacement key, and the second key. On the other hand, as represented by block 760, in accordance with the determination that the media content item has not been breached (e.g., the "No" branch from the decision block 720), the server (e.g., the license server 120, FIG. 1) provides the first key and the second key.

For example, as shown in FIG. 2, the license generator 124 provides the first key, e.g., key 1, which is derived from seed 1, for encrypting portion 210-1 and provides the second key, e.g., key 2, which is derived from seed 2, for encrypting portion 210-2. In another example, as shown in FIG. 6A, with a non-breached media content item, e.g., prior to time $T_1$ 610, in order to decrypt the non-breached media content item, the first key derived from seed 1 for protecting portions 640 and 680 as well as the second key derived from seed 2 for protecting portions 650-670 are provided. On the other hand, as shown in FIG. 3, during breach response, the license generator 124 provides the first key, e.g., key 1, and the replacement key, e.g., key 1', for re-encrypting portion 210-1, as well as the second key, e.g., key 2, for the protection of portion 2 210-2. In another example, as shown in FIG. 6B, at some point during breach response, e.g., after time $T_1$ 610, the breached media content item is protected with mixed seeds, e.g., the first key derived from seed 1 for protecting portion 640, the replacement key derived from the replacement seed 1' for protecting portion 680', and the second key derived from seed 2 for protecting portions 650-670.

In some embodiments, as represented by block 770, repairing the encrypted media content item in accordance with the determination that the media content item has been breached further includes determining whether or not media content items using keys derived from the first seed have been repaired. In accordance with a determination that the media content items using the keys derived from the first seed have been repaired, removing the first seed to complete the breach response.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
generating an encrypted media content item from a media content item including a first portion followed by a second portion using a plurality of encryption keys by:
encrypting the first portion of the media content item to generate a first encrypted portion using a first key of the plurality of encryption keys that is derived from a first seed of a first type, and
encrypting the second portion of the media content item to generate a second encrypted portion using a second key of the plurality of encryption keys that is derived from a second seed of a second type,
wherein the first portion of the media content item, which includes a first media-element type, is classified in a first category and the second portion of the media content item, which includes a second media-element type, is classified in a second category, the first portion is different from the second portion, and the first category is different from the second category;
determining whether the media content item has been breached; and
repairing the encrypted media content item in accordance with a determination that the media content item has been breached by:
re-encrypting the first encrypted portion using a replacement key derived from a replacement seed to generate a re-encrypted portion, wherein the replacement seed is of the first type, and
updating encryption metadata associated with the first encrypted portion to reference the re-encrypted portion and the replacement key.

2. The method of claim 1, wherein:
the first category is prioritized;
the first media-element type includes one or more of a reference frame and an audio chunk; and
the second media-element type includes a non-reference frame.

3. The method of claim 1, further comprising swapping the first seed according to a policy, wherein the swapping including:
obtaining a swapping seed that is of the first type;
identifying media content items with portions classified in the first category; and
re-encrypting the portions of the media content items using keys derived from the swapping seed.

4. The method of claim 3, wherein the policy specifies criteria associated with one or more of popularities of the media content items, ages of the media content items, values of the media content items, and a swapping schedule.

5. The method of claim 1, wherein re-encrypting the first encrypted portion of the media content item using the replacement key derived from the replacement seed includes:
obtaining the replacement key and the first key;
decrypting the first portion of the media content item using the first key; and
encrypting the first portion of the media content item using the replacement key.

6. The method of claim 1, wherein repairing the encrypted media content item in accordance with the determination that the first media content has been breached further includes:
forgoing re-encrypting the second portion of the media content item; and
forgoing updating encryption metadata associated with the second portion.

7. The method of claim 1, wherein updating the encryption metadata includes:
updating mappings of portions of the encrypted media content item to the plurality of keys, including mapping the re-encrypted portion to the replacement key.

8. The method of claim 1, wherein updating the encryption metadata includes:
identifying a discardable portion in the re-encrypted portion; and
recording the encryption metadata, including a key identifier associated with the replacement key and a range in the re-encrypted portion the replacement key applies, in the discardable portion.

9. The method of claim 8, wherein the encryption metadata is recorded at least one block before a non-discardable portion in the re-encrypted portion.

10. The method of claim 1, further comprising:
providing, in accordance with the determination that the media content item has been breached, the first key, the replacement key, and the second key.

11. The method of claim 1, further comprising:
providing, in accordance with a determination that the media content item has not been breached, the first key and the second key.

12. The method of claim 1, wherein repairing the encrypted media content item in accordance with the determination that the media content item has been breached further includes:
determining whether or not media content items using keys derived from the first seed have been repaired; and
removing the first seed in accordance with a determination that the media content items using the keys derived from the first seed have been repaired.

13. A system comprising:
an encoder operable to generate an encrypted media content item from a media content item including a first portion followed by a second portion using a plurality of encryption keys by:
encrypting the first portion of the media content item to generate a first encrypted portion using a first key of the plurality of encryption keys that is derived from a first seed of a first type, and
encrypting the second portion of the media content item to generate a second encrypted portion using a second key of the plurality of encryption keys that is derived from a second seed of a second type,
wherein the first portion of the media content item, which includes a first media-element type, is classified in a first category and the second portion of the media content item, which includes a second media-element type, is classified in a second category, the first portion is different from the second portion, and the first category is different from the second category;

a controller operable to determine whether the media content item has been breached; and the encoder is further operable to repair the encrypted media content item in accordance with a determination that the media content item has been breached by:

re-encrypting the first encrypted portion using a replacement key derived from a replacement seed to generate a re-encrypted portion, wherein the replacement seed is of the first type, and updating encryption metadata associated with the first encrypted portion to reference the re-encrypted portion and the replacement key.

14. The system of claim 13, wherein re-encrypting the first encrypted portion of the media content item using the replacement key derived from the replacement seed includes:

obtaining the replacement key and the first key;

decrypting the first portion of the media content item using the first key; and encrypting the first portion of the media content item using the replacement key.

15. The system of claim 13, wherein repairing the encrypted media content item in accordance with the determination that the first media content has been breached further includes:

forgoing re-encrypting the second portion of the media content item; and forgoing updating encryption metadata associated with the second portion.

16. The system of claim 13, wherein the controller is further operable to:

provide, in accordance with the determination that the media content item has been breached, the first key, the replacement key, and the second key.

17. The system of claim 13, wherein the controller is further operable to:

provide, in accordance with a determination that the media content item has not been breached, the first key and the second key.

18. The system of claim 13, further comprising:

a key server module operable to obtain a swapping seed that is of the first type, wherein the controller is further operable to identify media content items with portions classified in the first category, and the encryptor is further operable to re-encrypt the portions of the media content items using keys derived from the swapping seed.

19. The system of claim 18, wherein the policy specifies criteria associated with one or more of popularities of the media content items, ages of the media content items, values of the media content items, and a swapping schedule.

20. The system of claim 13, wherein repairing the encrypted media content item in accordance with the determination that the media content item has been breached further includes:

determining whether media content items using keys derived from the first seed have been repaired; and removing the first seed in accordance with a determination that the media content items using the keys derived from the first seed have been repaired.

* * * * *